United States Patent [19]
Ma

[11] Patent Number: 5,363,273
[45] Date of Patent: Nov. 8, 1994

[54] COMPUTER SYSTEM WITH REMOVABLE FLOPPY DISK DRIVE AND EXPANSION SLOT ASSEMBLY MOUNTED FLUSH IN ONE CORNER

[76] Inventor: Hsi K. Ma, 4F, No. 48, Sec. 2, Chung Cherng Road, Taipei, Taiwan, Prov. of China

[21] Appl. No.: 59,703
[22] Filed: May 10, 1993
[30] Foreign Application Priority Data
  Jul. 27, 1992 [CN] China .................... 92229155.1
[51] Int. Cl.$^5$ .................... H05K 7/12; G06F 1/16
[52] U.S. Cl. .................... 361/686; 361/685
[58] Field of Search .................... 364/708.1; 439/928; 360/137; 361/683–686, 725–727, 732, 740, 741, 756, 759; 312/223.2

[56] References Cited
U.S. PATENT DOCUMENTS 5,182,699  1/1993  Kobayashi et al. .................... 361/683
5,247,428  9/1993  Yu .................... 361/685 X
5,305,180  4/1994  Mitchell et al. .................... 361/685

*Primary Examiner*—Michael W. Phillips
*Attorney, Agent, or Firm*—Bucknam and Archer

[57] ABSTRACT

A computer system including a floppy disk drive and expansion slot assembly detachably fastened to a recessed hole on a mainframe. The floppy disk drive and expansion slot assembly has a side rail engaged into a mounting groove on one vertical side wall of the recessed hole of the mainframe, two connectors electrically and respectively connected to two respective connectors on the mainframe, and a slot for inserting a floppy disk or an expansion card. The mainframe has a mounting board fitted into a bottom recessed hole on the floppy disk drive and expansion slot assembly, and two bolt controlled spring latches respectively engaged into respective lock holes on the floppy disk drive and expansion slot assembly to hold it in position.

1 Claim, 3 Drawing Sheets

COMPUTER SYSTEM WITH REMOVABLE FLOPPY DISK DRIVE AND EXPANSION SLOT ASSEMBLY MOUNTED FLUSH IN ONE CORNER

BACKGROUND OF THE INVENTION

The present invention relates to computers, and more particularly to a computer system having a detachable floppy disk drive and expansion slot assembly for loading a floppy disk or an expansion card.

A variety of computer systems are manufactured and widely used in a variety fields for different purposes. It has been the market trend to provide computer systems with MINIMIZED size and improved functions. A standard computer system is generally comprised of a mainframe, a floppy disk drive, a hard disk drive, a keyboard, and expansion cards, etc. In order to minimize the size, peripheral equipment are generally coupled to the mainframe, i.e., the mainframe has spaces and connecting devices for mounting peripheral equipment. Because different peripheral apparatus are fastened to the mainframe at different locations, the size of the computer system can not be minimized.

SUMMARY OF THE INVENTION

The present invention provides a computer system which comprises a floppy disk drive and expansion slot assembly detachably fastened to a mainframe and locked by bolt controlled spring latches on the mainframe. The floppy disk drive and expansion slot assembly has a slot on an outer side into which a floppy disk or an expansion card is inserted according to different operational modes.

DETAILED DESCRIPTION OF THE PREFERRED EMBODIMENT

Figure 1:
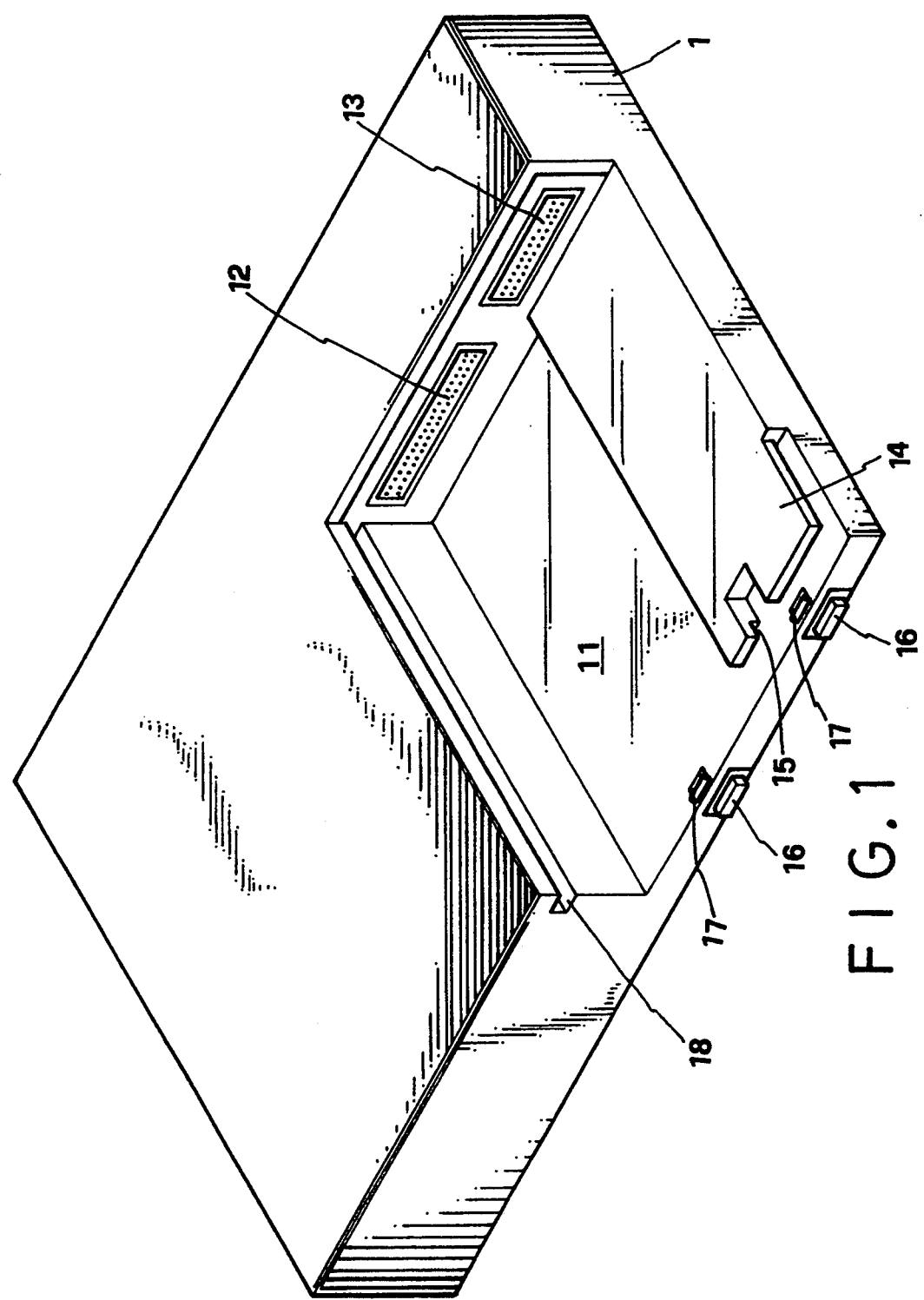
FIG. 1 is a perspective view of a computer mainframe according to the present invention.
Figure 2:
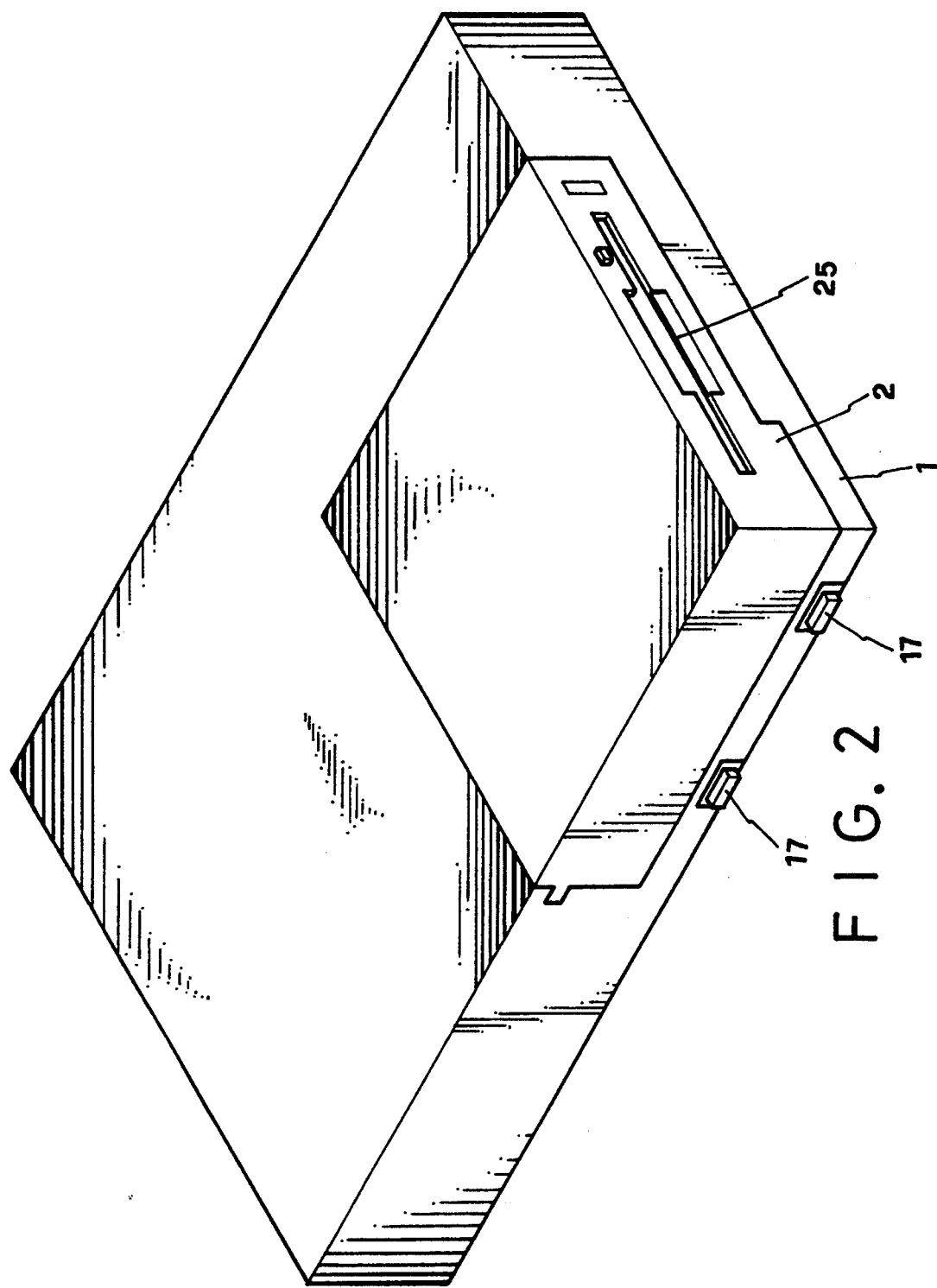
FIG. 2 shows a floppy disk drive installed in the computer mainframe shown in FIG. 1.

Referring to FIGS. 1 and 2, the present invention is generally comprised of a computer mainframe 1, and a floppy disk drive and expansion slot assembly 2. The computer mainframe 1 is the central processing unit of a normal computer (floppy disk drive and expansion device excluded), having a rectangular notch or recessed hole 11 around one corner thereof and two multi-pin connectors 12;13 on one vertical side wall of the rectangular recessed hole 11. One connector 12 has 60-100 contact pins. The other connector 12 has 30-40 contact pins. A mounting board 14 is disposed in the recessed hole 11 at an outer side. The mounting board 14 has a curved front end fitting a bottom recessed hole 23 on the floppy disk drive and expansion slot assembly 2, and a groove 15 on the front end thereof into which a corresponding projecting portion on the bottom recessed hole 23 of the floppy disk drive and expansion slot assembly 2 fits. Two spring latches 17 are disposed in respective holes (not indicated) along the border of the recessed hole 11 at one side and driven by respective bolt 16 into a respective unlocking position from a respective normal locking position. An elongated mounting groove 18 is disposed around the vertical side wall of the recessed hole 11 for mounting the floppy disk drive and expansion slot assembly 2.

Figure 3:
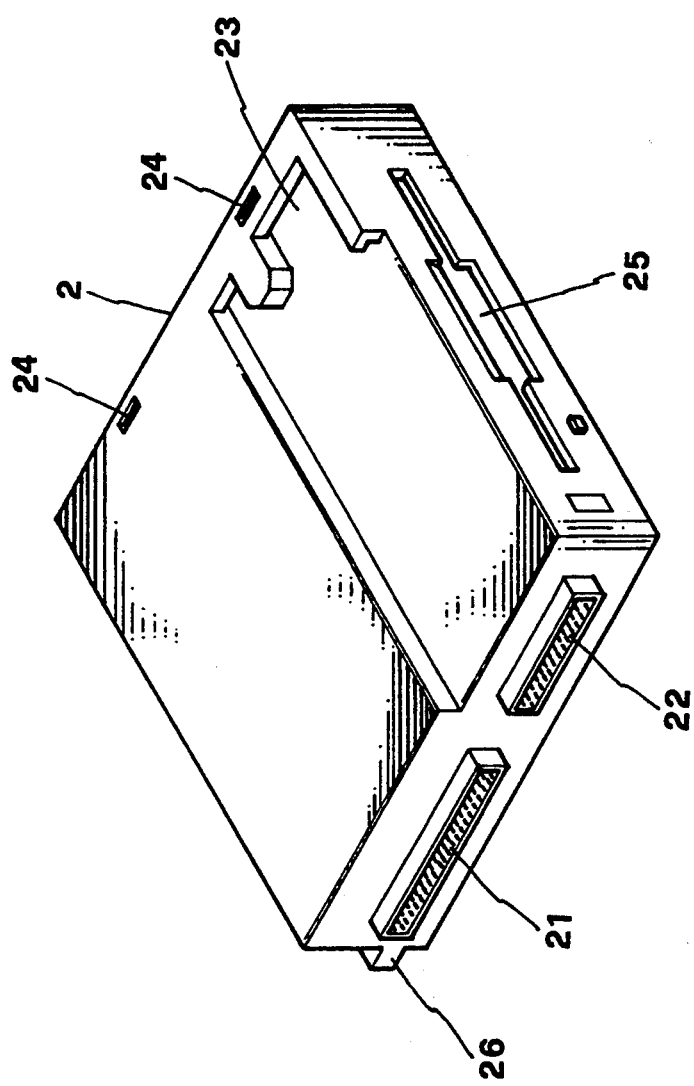
FIG. 3 is a perspective view of the bottom of a floppy disk drive and expansion slot assembly according to the present invention.

Referring to FIG. 3, the floppy disk drive and expansion slot assembly 2 fits the rectangular recessed hole 11 in a flush manner, having two connectors 21;22 spaced on a lateral vertical side wall thereof respectively connected to the connectors 12;13 on the mainframe 1 to connect the circuit. A recessed hole 23 is disposed on the bottom surface of the floppy disk drive and expansion slot assembly 2, into which the mounting board 14 of the mainframe 1 fits. Two lock holes 24 are disposed on the bottom surface of the floppy disk drive and expansion slot assembly 2 along the border, into which the spring latches 17 engage respectively. A disk slot 25 is disposed on a front vertical side wall of the floppy disk drive and expansion slot assembly 2 for inserting a disk or an expansion card. A rail 26 is disposed on a rear vertical side wall of the floppy disk drive and expansion slot assembly 2 in horizontal, which fits into the mounting groove 18 to hold the floppy disk drive and expansion slot assembly 2 in place as the floppy disk drive and expansion slot assembly 2 is inserted in the recessed hole 11 on the mainframe 1.

When assembled, as shown in FIG. 2, the disk slot 25 is disposed on the outside for inserting a floppy disk or an expansion card.

As indicated, the present invention combines an expansion slot device and a floppy disk drive into a combined unit to minimize the size of the computer system.

While only the preferred embodiment of the present invention has been shown and described, it will be understood that various modifications and changes could be made without departing from the spirit and scope of the invention.

What is claimed is:

1. A computer system comprising:

a computer mainframe having a rectangular recessed hole around one corner thereof, said rectangular recessed hole having a border, a flat bottom wall, a first vertical side wall and a second vertical side wall abutted at a respective inner end at right angles, two multi-pin connectors on said first vertical side wall, a mounting board raised above said flat bottom, two spring latches disposed in respective holes on said flat bottom wall along said border and driven by respective bolts into respective unlocking positions from respective normal locking positions, an elongated mounting groove disposed along said second vertical side wall;

a floppy disk drive and expansion slot assembly fitted into said rectangular recessed hole in a flush manner, said floppy disk drive comprising two connectors electrically and respectively connected to the multi-pin connectors on said mainframe, a recessed hole disposed on a bottom surface thereof, into which said mounting board of said mainframe fits, two lock holes disposed on the bottom surface of said floppy disk drive and expansion slot assembly, into which said spring latches engage respectively, a slot on a front vertical side wall of said floppy disk drive and expansion slot assembly for inserting a disk or an expansion card, and a rail on a rear vertical side wall of said floppy disk drive and expansion slot assembly fitted into said mounting groove to hold said floppy disk drive and expansion slot assembly in place.

* * * * *